US011964365B2

(12) United States Patent
Chen

(10) Patent No.: US 11,964,365 B2
(45) Date of Patent: Apr. 23, 2024

(54) HAND TOOL

(71) Applicant: FINE FORGE INDUSTRY CORPORATION, Nantou County (TW)

(72) Inventor: Kuo-Lung Chen, Nantou County (TW)

(73) Assignee: FINE FORGE INDUSTRY CORPORATION, Nantou County (TW)

( * ) Notice: Subject to any disclaimer, the term of this patent is extended or adjusted under 35 U.S.C. 154(b) by 170 days.

(21) Appl. No.: 17/587,923

(22) Filed: Jan. 28, 2022

(65) Prior Publication Data

US 2023/0241746 A1 Aug. 3, 2023

(51) Int. Cl.

*B25B 13/08* (2006.01)
*B25B 13/04* (2006.01)
*B25G 1/04* (2006.01)

(52) U.S. Cl.

CPC .............. *B25B 13/08* (2013.01); *B25B 13/04* (2013.01); *B25G 1/043* (2013.01)

(58) Field of Classification Search

CPC .......... B25G 1/043; B25B 13/04; B25B 13/08
USPC ................................. 81/177.2, 177.8, 177.9
See application file for complete search history.

(56) References Cited

U.S. PATENT DOCUMENTS

| | | | | |
|---|---|---|---|---|
| 1,568,442 A * | 1/1926 | Carver | B25B 13/481 | 84/459 |
| 2,420,132 A * | 5/1947 | Gryniuck | B25G 1/063 | 81/58.3 |
| 3,270,597 A * | 9/1966 | Neff | B25B 13/46 | 81/177.2 |
| 4,530,262 A * | 7/1985 | Pownall | B25G 1/063 | 81/177.1 |
| 6,993,998 B1 * | 2/2006 | Kao | B25B 13/46 | 81/177.85 |
| 7,201,085 B1 * | 4/2007 | Hsieh | B25G 1/063 | 81/177.1 |
| 2005/0268753 A1 * | 12/2005 | Lin | B25B 13/461 | 81/177.9 |

* cited by examiner

*Primary Examiner* — Hadi Shakeri

(74) *Attorney, Agent, or Firm* — Muncy, Geissler, Olds & Lowe, P.C.

(57) ABSTRACT

A hand tool is provided, including: a first member; a second member; a shaft, connected with the first member, rotatably inserted to the second member, including positioning slots; and a control member, disposed on the second member, including at least one tooth; wherein the control member can be released by disengagement of the at least one tooth from the positioning slots so that the first and second members are rotatable relative to each other, and the control member can be locked by engagement of the at least one tooth within at least one of the positioning slots so that the first member is non-rotatable relative to the second member; wherein when the at least one tooth is engaged within at least one positioning slot, at least one blocking wall of the tooth is in gapless surface contact with at least one side wall of the slot.

9 Claims, 7 Drawing Sheets

HAND TOOL

BACKGROUND OF THE INVENTION

Field of the Invention

The present invention relates to a hand tool.

Description of the Prior Art

Hand tools are usually used in various operations and are convenient to carry, and have good operability. There are many types of hand tools. According to various objects to be driven, properties and uses, the hand tools can be divided into pliers, wrenches, screwdrivers, sockets, scissors, cutters, impact tools, and measurement tools, etc. Among them, the wrench is the most common in daily life and industries. The wrench includes a handle and a driving portion disposed at an end of the handle, wherein the driving portion is provided in a configuration such as an assembly hole, clamping jaws or the like, for connection with the object to be driven.

However, the conventional wrench is often too short to insert into and operate in a narrow working space. Moreover, the conventional wrench is often provided in a straight configuration, so it is difficult to reach the object surrounded by obstacles in the working space. As a result, there are many limitations in using the conventional hand tools.

The present invention is, therefore, arisen to obviate or at least mitigate the above-mentioned disadvantages.

SUMMARY OF THE INVENTION

The main object of the present invention is to provide a hand tool which is angularly adjustable, and is stable and efficient in operation.

To achieve the above and other objects, a hand tool is provided, including: a first member; a second member; a shaft, including a first end portion and a second end portion on an axis, the first end portion being connected with the first member, the second end portion being rotatably inserted to the second member, an outer circumferential wall of the second end portion including a plurality of positioning slots arranged along a circumferential direction of the shaft; and a control member, movable between a release position and a lock position and disposed on the second member, including at least one tooth; wherein when the control member is located in the release position, the at least one tooth is disengaged from any of the plurality of positioning slots so that the first member and the second member are rotatable relative to each other about the shaft, and when the control member is located in the lock position, the at least one tooth is engaged within at least one of the plurality of positioning slots so that the first member is non-rotatable relative to the second member; wherein each of the plurality of positioning slots defines two side walls on the circumferential direction of the shaft, the at least one tooth defines two blocking walls on the circumferential direction of the shaft, and when the at least one tooth is engaged within at least one of the plurality of positioning slots, a portion of at least one of the two blocking walls within the positioning slot is in gapless surface contact with at least one of the two side walls.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
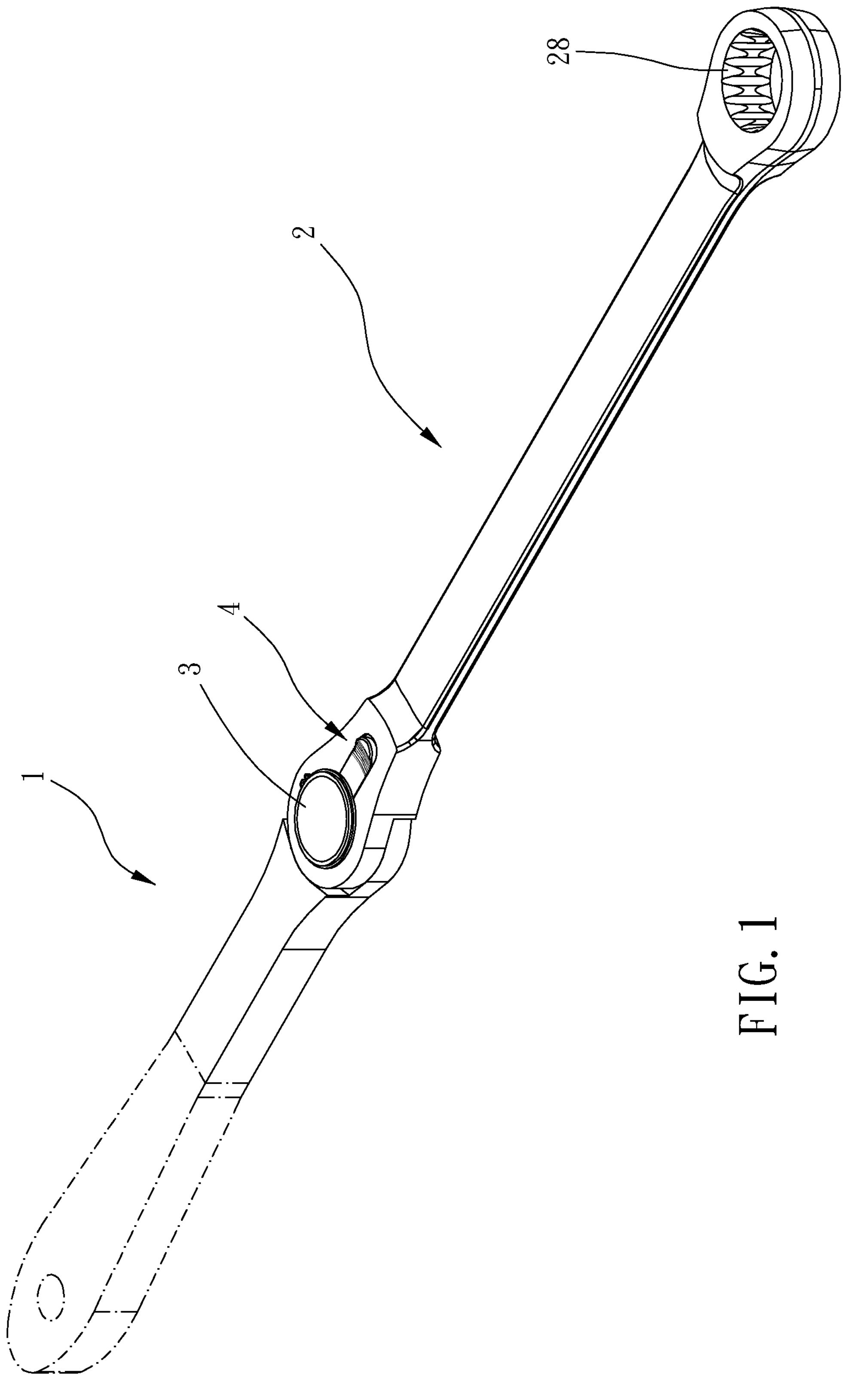
FIG. 1 is a stereogram of a preferable embodiment of the present invention.

Please refer to FIGS. 1 to 8 for a preferable embodiment of the present invention. A hand tool of the present invention includes a first member 1, a second member 2, a shaft 3 and a control member 4.

The shaft 3 includes a first end portion 32 and a second end portion 33 on an axis 31, the first end portion 32 is connected with the first member 1, the second end portion 33 is rotatably inserted to the second member 2, and an outer circumferential wall of the second end portion 33 includes a plurality of positioning slots 34 arranged along a circumferential direction of the shaft 3. The control member 4 is movable between a release position and a lock position and disposed on the second member 2, and the control member 4 includes at least one tooth 5.

When the control member 4 is located in the release position, the at least one tooth 5 is disengaged from any of the plurality of positioning slots 34 so that the first member 1 and the second member 2 are rotatable relative to each other about the shaft 3, which allows angular adjustment of the hand tool for various operational requirements. When the control member 4 is located in the lock position, the at least one tooth 5 is engaged within at least one of the plurality of positioning slots 34 so that the first member 1 is non-rotatable relative to the second member 2, which is able to be used to drive an object such as bolt, nut or the like.

Each of the plurality of positioning slots 34 defines two side walls 35 on the circumferential direction of the shaft 3, and the at least one tooth 5 defines two blocking walls 51 on the circumferential direction of the shaft 3. When the at least one tooth 5 is engaged within at least one of the plurality of positioning slots 34, a portion of at least one of the two blocking walls 51 within the positioning slot 34 in gapless surface contact with at least one of the two side walls 35, which provides good blocking and engagement for stable and even distribution of force.

The two blocking walls 51 and the two side walls 35 are in gapless surface contact with each other to prevent the shaft 3 from rotating.

Specifically, each of the plurality of positioning slots 34 defines a first central line 36 extending between the two side walls 35, the first central line 36 intersects with the axis 31, and the two side walls 35 and the first central line 36 are in parallel. Specifically, the at least one tooth includes a plurality of teeth 5, the number of the plurality of the teeth 5 is odd, the plurality of the teeth 5 includes a first tooth 52 and a plurality of second teeth 53, the plurality of the second teeth 53 are located at opposing sides of the first tooth 52, and a second central line 54 of the first tooth 52 intersects with the axis 31.

When the first tooth 52 is in inserted within the positioning slot 34, portions of the two blocking walls 51 of the first tooth 52 within the positioning slot 34 are in gapless surface contact with the two side walls 35, and the first tooth 52 serves as a blocking member for blocking the shaft 3 from rotating. When the second tooth 53 is inserted within the positioning slot 34, the portion of one of the two blocking walls 51 of the second tooth 53 within the positioning slot 34 is in gapless surface contact with one of the two side walls 35, and the portion of the other of the two blocking walls 51 of the second tooth 53 within the positioning slot 34 and the other of the two side walls 35 form a gap 7 therebetween. Parts of the plurality of the second teeth 53 located at a side of the first tooth 52 can block the shaft 3 from rotating in a first direction, and parts of the plurality of the second teeth 53 located at another side of the first tooth 52 can block the shaft 3 from rotating in a second direction opposite to the first direction.

The gap 7 is formed between the blocking wall 51 of the second tooth 53 adjacent to the first tooth 52 and one of the two side walls 35 of the positioning slot 34, and the gap 7 enlarges radially outward relative to the shaft 3. As viewed along the axis 31, the gap 7 is triangular.

Preferably, the number of the plurality of positioning slots 34 is equal to or less than 72, which ensures each portion between every neighboring two of the positioning slot 34 has sufficient structural strength.

Preferably, the hand tool further includes an elastic member 6, the elastic member 6 is disposed between the second member 2 and the control member 4, and the elastic member 6 biases the control member 4 to move toward the lock position.

Preferably, the control member 4 includes a concave-convex structure 44 for frictional grip. In this embodiment, the concave-convex structure 44 is in a stepped configuration, and the concave-convex structure 44 is disposed at a rear end portion 42 of the control member 4.

Figure 2:
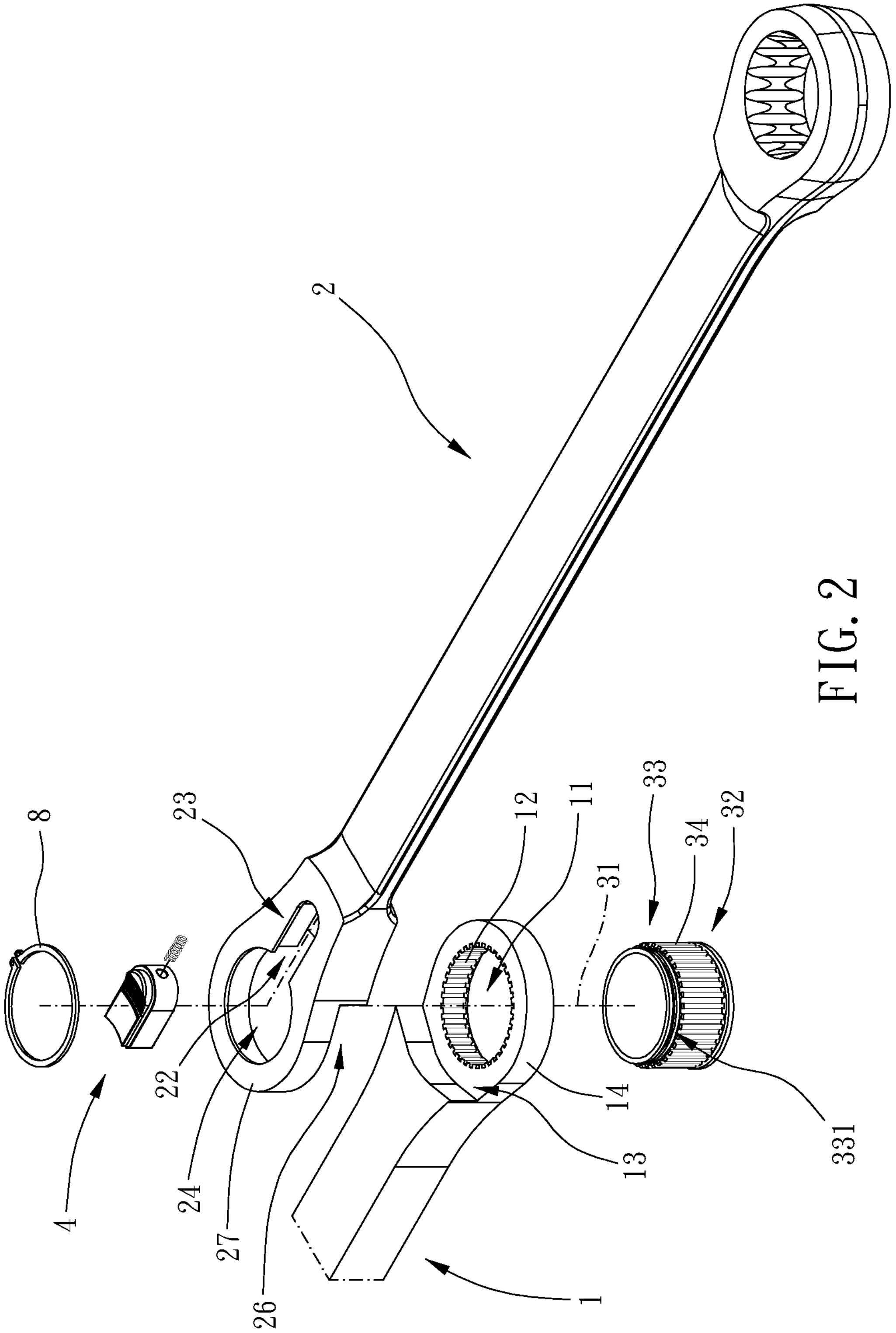
FIG. 2 is a breakdown drawing of a preferable embodiment of the present invention.
Figure 3:
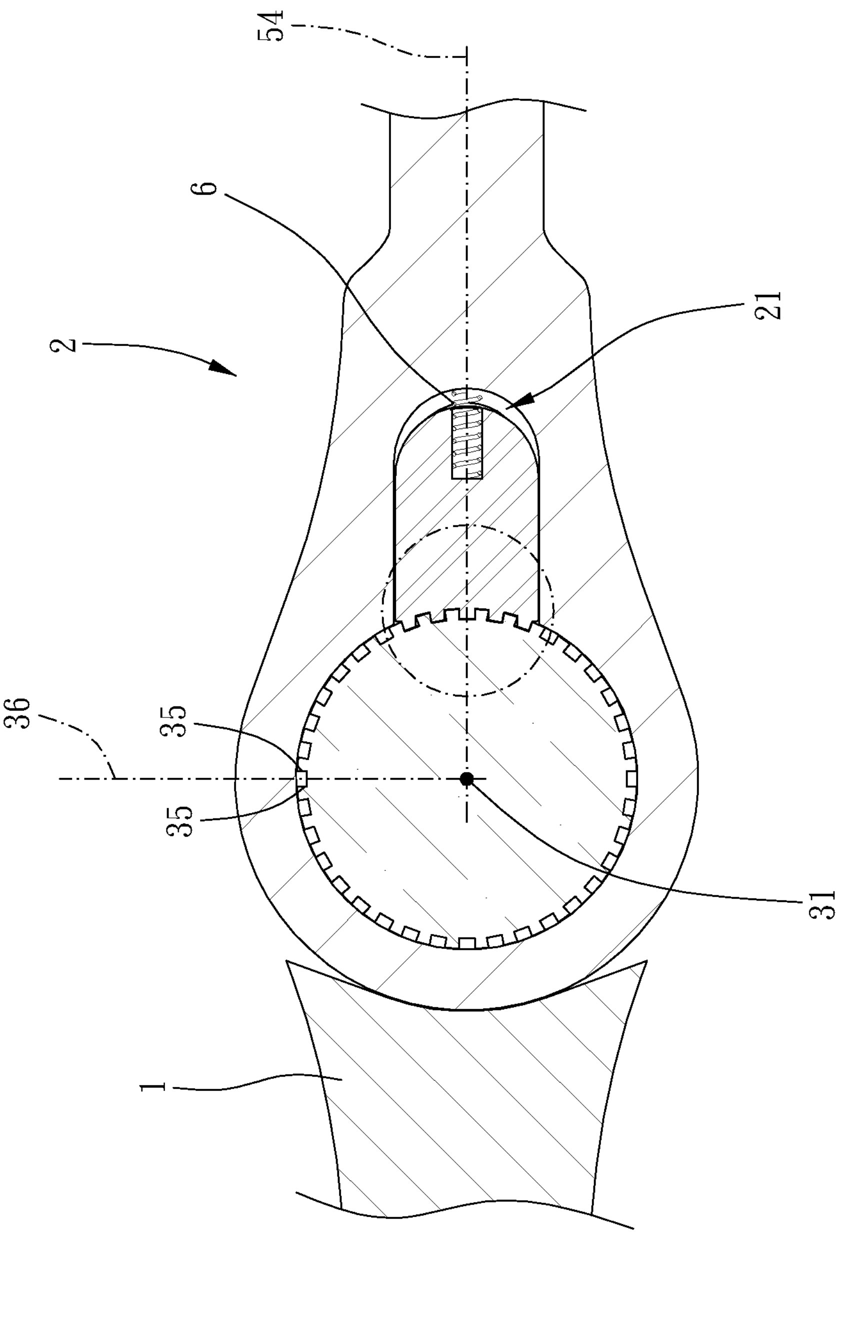
FIG. 3 is a partial enlarged cross-sectional view of a preferable embodiment of the present invention.
Figure 4:
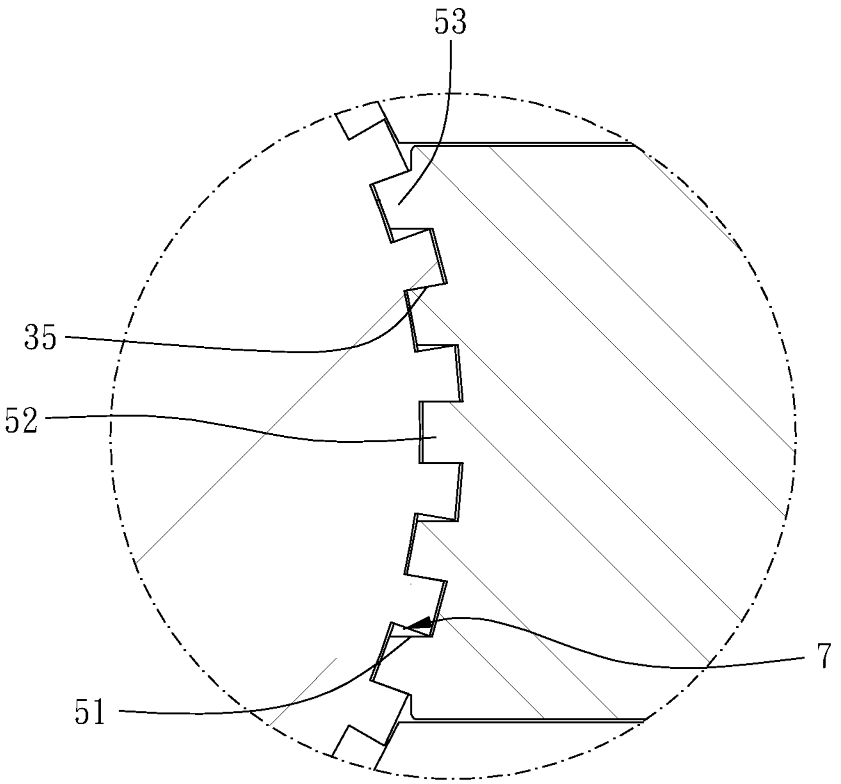
FIG. 4 is a partial enlargement of FIG. 3.
Figure 5:
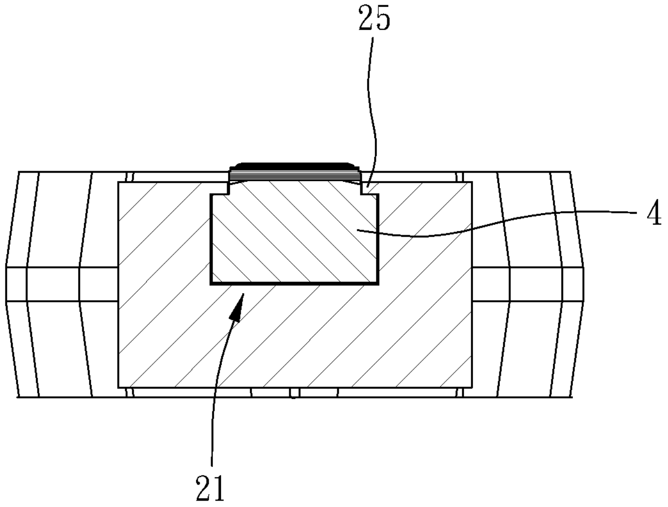
FIG. 5 is another cross-sectional view of a preferable embodiment of the present invention.
Figure 6:
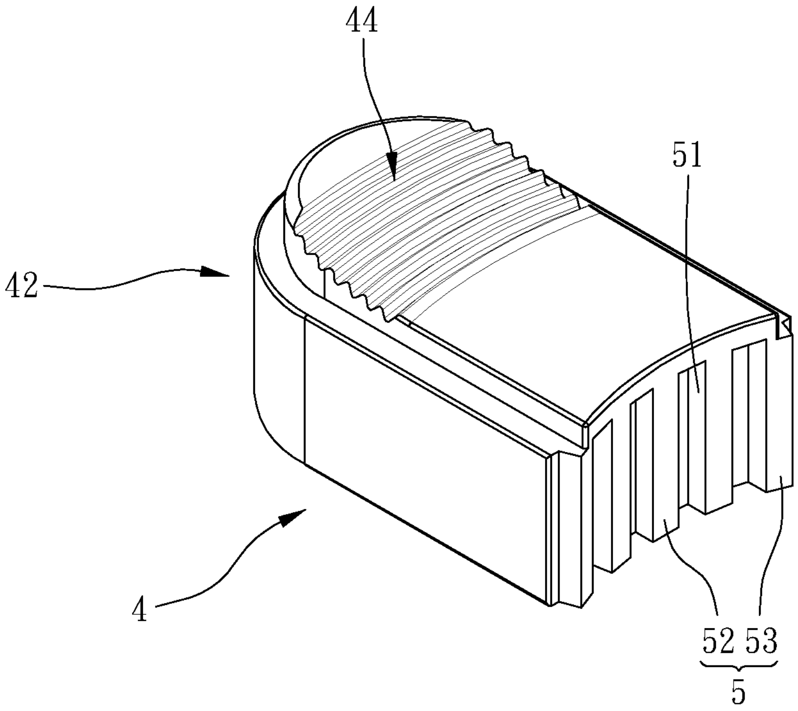
FIGS. 6 and 7 are drawings showing a control member of a preferable embodiment of the present invention.
Figure 7:
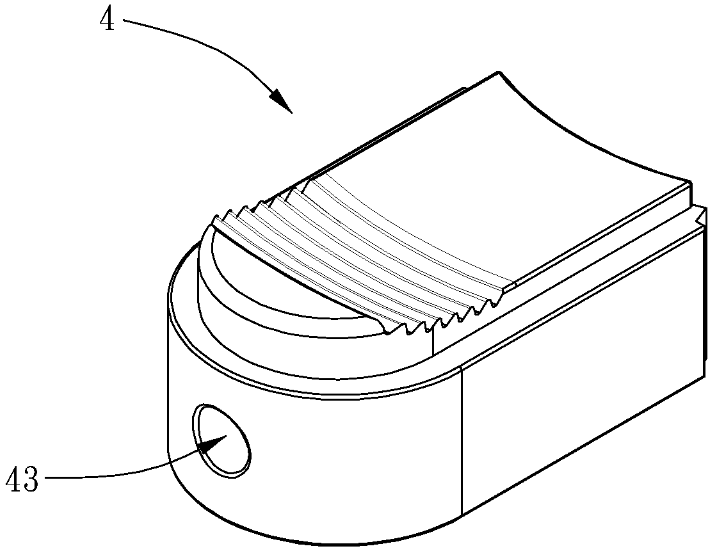
Figure 8:
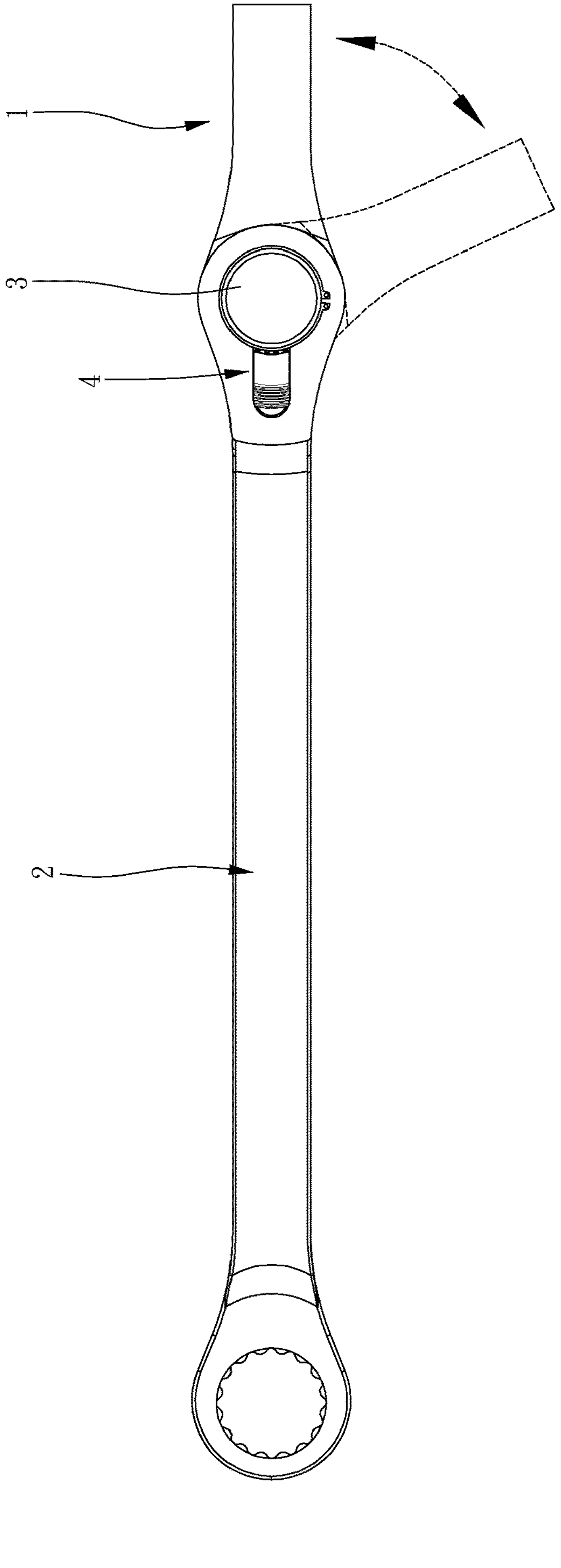
FIG. 8 is a drawing showing operation of a first member and a second member of a preferable embodiment of the present invention.

Please refer to FIGS. 2, 6 and 7, the plurality of positioning slots 34 extend from the first end portion 32 to the second end portion 33, the first member 1 includes a connection hole 11 within which a plurality of meshing teeth 12 are disposed, and the plurality of meshing teeth 12 are configured to be engaged within the plurality of positioning slots 34 so that the first member 1 and the shaft 3 are movable with each other. The second member 2 includes a receiving room 21 and a through hole 24 which are in communication with each other, the second end portion 33 is inserted within the through hole 24, the control member 4 is slidably disposed within the receiving room 21, and the control member 4 further includes a limitation hole 43. An end of the elastic member 6 is inserted within the limitation hole 43, and another end of the elastic member is abutted against a side wall of the receiving room 21, to ensure the elastic member 6 to operate smoothly. The plurality of the teeth 5 is disposed at a front end portion 41 of the control member 4, and the front end portion 41 is insertable within the through hole 24 so that a plurality of the teeth 5 is engaged within at least one of the plurality of positioning slots 34.

Specifically, the second end portion 33 of the shaft 3 is disposed through the through hole 24 along the axis 31, a receiving groove 331 is disposed on the outer circumferential wall of the second end portion 33, a retainer 8 is engaged within the receiving groove 331, and the retainer 8 partially projects beyond the receiving groove 331 and is blocked axially with the second member 2 so that the shaft 3 is rotatably connected to the second member 2. In this embodiment, the retainer 8 is a C-shaped retainer, which is easy and convenient to assemble/disassemble.

Figure 9:
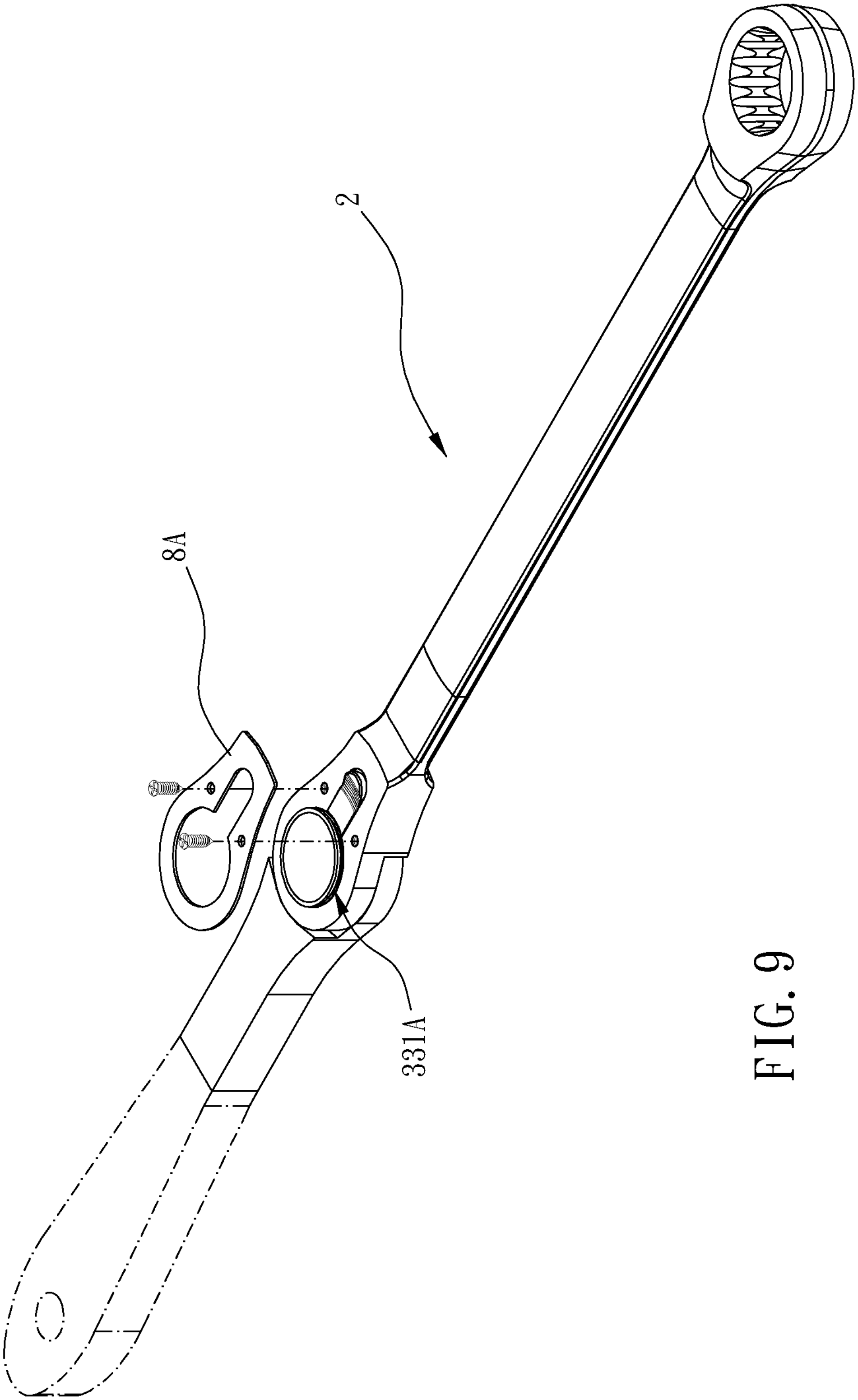
FIG. 9 is a partial breakdown drawing of another preferable embodiment of the present invention.

Please refer to FIG. 9, in an alternative embodiment, and the retainer 8A is plate-shaped and engaged within the receiving groove 331A. The retainer 8A is fixed to the second member 2 by at least one fastener (such as screw) so that the retainer 8A can enhance the combination and strength of the parts of the hand tool.

The receiving room 21 includes a first opening 22 and a second opening 23, the first opening 22 is open toward a direction in which the control member 4 moves, the front end portion 41 is projectable beyond the first opening 22 to be within the through hole 24, the second opening 23 is open toward a direction lateral to the direction toward which the first opening 22 is open, and two blocking flanges 25 which define the second opening 23 block the control member 4 in the direction toward which the second opening 23 is open. The shaft 3 can be locked or released by moving the control member 4.

An end of the first member 1 includes a first space 13 and a first board 14, the first board 14 includes the connection hole 11, an end of the second member 2 includes a second space 26 and a second board 27, the second board 27 includes the through hole 24, and the first board 14 and the second board 27 are stacked. The first space 13 receives the second board 27, and the second space 26 receives the first board 14, so that the total thickness of the first member 1 and the second member 2 which are stacked is reduced. In this embodiment, the first member 1 further includes a grip portion for hand grip, and the second member 2 further includes a driving portion 28 configured for connection to the object to be driven.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A hand tool, including:

a first member;

a second member;

a shaft, including a first end portion and a second end portion on an axis, the first end portion being connected with the first member, the second end portion being rotatably inserted to the second member, an outer circumferential wall of the second end portion including a plurality of positioning slots arranged along a circumferential direction of the shaft; and a control member, movable between a release position and a lock position and disposed on the second member, including at least one tooth;

wherein when the control member is located in the release position, the at least one tooth is disengaged from any of the plurality of positioning slots so that the first member and the second member are rotatable relative to each other about the shaft, and when the control member is located in the lock position, the at least one tooth is engaged within at least one of the plurality of positioning slots so that the first member is non-rotatable relative to the second member;

wherein each of the plurality of positioning slots defines two side walls on the circumferential direction of the shaft, the at least one tooth defines two blocking walls on the circumferential direction of the shaft, and when the at least one tooth is engaged within at least one of the plurality of positioning slots, a portion of at least one of the two blocking walls within the positioning slot is in gapless surface contact with at least one of the two side walls;

wherein the second member includes a receiving room and a through hole which are in communication with each other, the second end portion is inserted within the through hole, the control member is slidably disposed within the receiving room, the at least one tooth is disposed on a front end portion of the control member, and the front end portion is insertable within the through hole so that the at least one tooth is engaged within at least one of the plurality of positioning slots.

2. The hand tool of claim 1, wherein each of the plurality of positioning slots defines a first central line extending between the two side walls, the first central line intersects with the axis, and the two side walls and the first central line are in parallel.

3. The hand tool of claim 1, further including an elastic member, wherein the elastic member is disposed between the second member and the control member, and the elastic member biases the control member to move toward the lock position.

4. The hand tool of claim 1, wherein the receiving room includes a first opening and a second opening, the first opening is open toward a direction in which the control member moves, the front end portion is projectable beyond the first opening to be within the through hole, the second opening is open toward a direction lateral to the direction toward which the first opening is open, and two blocking flanges which define the second opening block the control member in the direction toward which the second opening is open.

5. The hand tool of claim 4, wherein each of the plurality of positioning slots defines a first central line extending between the two side walls, the first central line intersects with the axis, and the two side walls and the first central line are in parallel; the hand tool further includes an elastic member, the elastic member is disposed between the second member and the control member, and the elastic member biases the control member to move toward the lock position; the control member includes a concave-convex structure for frictional grip; the plurality of positioning slots extend from the first end portion to the second end portion, the first member includes a connection hole within which a plurality of meshing teeth are disposed, and the plurality of meshing teeth are configured to be engaged within the plurality of positioning slots so that the first member and the shaft are movable with each other; the at least one tooth includes a plurality of teeth, the plurality of the teeth includes a first tooth and a plurality of second teeth, the plurality of the second teeth are located at opposing sides of the first tooth, a second central line of the first tooth intersects with the axis; when the first tooth in inserted within the positioning slot, portions of the two blocking walls of the first tooth within the positioning slot are in gapless surface contact with the two side walls; when the second tooth is inserted within the positioning slot, the portion of one of the two blocking walls of the second tooth within the positioning slot is in gapless surface contact with one of the two side walls, and the portion of the other of the two blocking walls of the second tooth within the positioning slot and the other of the two side walls form a gap therebetween; the gap is formed between the blocking wall of the second tooth adjacent to the first tooth and one of the two side walls of the positioning slot, and the gap enlarges radially outward relative to the shaft; the number of the plurality of the teeth is odd; the control member further includes a limitation hole, an end of the elastic member is inserted within the limitation hole, another end of the elastic member is abutted against a side wall of the receiving room; the concave-convex structure is in a stepped configuration; the first member includes a first space and a first board, the first board includes the connection hole, the second member includes a second space and a second board, the second board includes the through hole, the first board and the second board are stacked, the first space receives the second board, and the second space receives the first board; the number of the plurality of positioning slots is equal to or less than 72; as viewed along the axis, the gap is triangular; the first member further includes a grip portion, the second member further includes a driving portion; the concave-convex structure is disposed at a rear end portion of the control member; the second end portion of the shaft is disposed through the through hole along the axis, a receiving groove is disposed on the outer circumferential wall of the second end portion, a retainer is engaged within the receiving groove, the retainer partially projects beyond the receiving groove and is blocked axially with the second member so that the shaft is rotatably connected to the second member.

6. The hand tool of claim 1, wherein the control member includes a concave-convex structure for frictional grip.

7. The hand tool of claim 1, wherein the plurality of positioning slots extend from the first end portion to the second end portion, the first member includes a connection hole within which a plurality of meshing teeth are disposed, and the plurality of meshing teeth are configured to be engaged within the plurality of positioning slots so that the first member and the shaft are movable with each other.

8. The hand tool of claim 1, wherein the at least one tooth includes a plurality of teeth, the plurality of the teeth includes a first tooth and a plurality of second teeth, the plurality of the second teeth are located at opposing sides of the first tooth, a second central line of the first tooth intersects with the axis; when the first tooth is in inserted within the positioning slot, portions of the two blocking walls of the first tooth within the positioning slot are in gapless surface contact with the two side walls; when the second tooth is inserted within the positioning slot, the portion of one of the two blocking walls of the second tooth within the positioning slot is in gapless surface contact with one of the two side walls, and the portion of the other of the two blocking walls of the second tooth within the positioning slot and the other of the two side walls form a gap therebetween.

9. The hand tool of claim 8, wherein the gap is formed between the blocking wall of the second tooth adjacent to the first tooth and one of the two side walls of the positioning slot, and the gap enlarges radially outward relative to the shaft.

* * * * *